United States Patent [19]

Ohya et al.

[11] Patent Number: 4,732,795
[45] Date of Patent: Mar. 22, 1988

[54] HEAT-SHRINKABLE LAMINATE TUBULAR FILM

[75] Inventors: Masaki Ohya; Yoshiharu Nishimoto, both of Iwaki, Japan

[73] Assignee: Kureha Kagaku Kogyo Kabushiki Kaisha, Tokyo, Japan

[21] Appl. No.: 675,307

[22] Filed: Nov. 27, 1984

[30] Foreign Application Priority Data

Dec. 2, 1983 [JP] Japan .................................. 58-228116

[51] Int. Cl.$^4$ .................... B32B 7/02; B32B 27/08; B32B 27/30
[52] U.S. Cl. .................................... 428/36; 428/213; 428/214; 428/475.8; 428/476.1; 428/476.3; 428/476.9; 428/483; 428/518
[58] Field of Search .............. 428/518, 56, 483, 475.8, 428/476.1, 926, 476.3, 476.9, 213, 214

[56] References Cited

U.S. PATENT DOCUMENTS

| | | | |
|---|---|---|---|
| 3,622,439 | 11/1971 | Manne et al. ................... | 428/475.8 |
| 4,133,924 | 1/1979 | Seino et al. ..................... | 428/181 |
| 4,188,443 | 2/1980 | Mueller et al. .................. | 428/483 |
| 4,289,830 | 9/1981 | Knott, II ........................ | 428/475.8 |
| 4,309,466 | 1/1982 | Stillman ......................... | 428/518 |
| 4,438,180 | 3/1984 | Lang et al. ...................... | 428/475.8 |

FOREIGN PATENT DOCUMENTS

| | | | |
|---|---|---|---|
| 0051480 | 5/1982 | European Pat. Off. ........... | 428/518 |
| 2516067 | 5/1983 | France ............................ | 428/518 |
| 1422358 | 1/1976 | United Kingdom . | |
| 1591424 | 6/1981 | United Kingdom . | |

Primary Examiner—John E. Kitle
Assistant Examiner—James J. Seidleck
Attorney, Agent, or Firm—Oblon, Fisher, Spivak, McClelland & Maier

[57] ABSTRACT

Disclosed herein is a heat-shrinkable laminate tubular film comprising a gas-barrier layer of a copolymer of vinylidene chloride, outer layers of a polyolefin, at least one intermediate layer of a polyamide or a thermoplastic polyester both of which show a crystal melting point of not more than 240° C. and have a specified thickness, and adhesive layers disposed between any of the above layers.

10 Claims, 1 Drawing Figure

HEAT-SHRINKABLE LAMINATE TUBULAR FILM

BACKGROUND OF THE INVENTION

The present invention relates to a heat-shrinkable laminate tubular film showing an adequate rigidity and a favorable stretchability and comprising a gas-barrier layer of a copolymer of vinylidene chloride and at least one layer of a polyamide or a thermoplastic polyester having a specified thickness.

More in detail, the present invention relates to a heat-shrinkable laminate tubular film comprising a gas-barrier layer of a copolymer of vinylidene chloride, outer layers of a polyolefin, at least one intermediate layer of a polyamide or a thermoplastic polyester both of which show a crystal melting point of not more than 240° C. and have a specified thickness, and adhesive layers disposed between any of the above layers.

For packaging the foodstuffs non-uniform and irregular shape, a method of heat-shrink packaging is generally applied, and since the thus packaged foodstuff should be preserved safely for a long time period, it is necessary that the packaging used in such a packaging is impermeable to gases, particularly to gaseous oxygen, in other words, the packaging material must have a gas-barrier property.

As the heat shrinkable gas-barrier film for packaging the foodstuffs, a single film of a copolymer of vinylidene chloride (hereinafter referred to as VDC) has been utilized. However, because of the poor mechanical properties of the single film of VDC at low temperatures, a composite laminate film comprising a gas-barrier layer of VDC and an outer layer of polyolefin has been developed. For instance, Japanese Patent Application Laying-Open No. 58-128821 (1983) discloses a laminate film comprising a gas-barrier layer of VDC and outer layers of a copolymer of ethylene and vinyl acetate (hereinafter referred to as EVA), and the disclosed film has solved the problem of the poor mechanical properties at low temperatures. However, because of the lack of rigidity in such a film, such a laminate film cannot exhibit a satisfactory operational processability in packaging foodstuffs.

As a result of the present inventors' studies, the problem of the lack of rigidity has been solved by incorporating a layer of a polyamide or a thermoplastic polyester between the gas-barrier layer and the outer layer of polyolefin of the laminate film.

SUMMARY OF THE INVENTION

In a first aspect of the present invention, there is provided a heat-shrinkable laminate tubular film comprising a gas-barrier layer of a copolymer of vinylidene chloride having a thickness of not less than 6 $\mu$m and not more than 30% of the total thickness of the tubular film, outer layers of a polyolefin, at least one intermediate layer of a polyamide or a thermoplastic polyester both of which show a crystal melting point of not more than 240° C. and have a thickness of 5 to 40% of the total thickness of the tubular film, and adhesive layers disposed between any of the above layers.

In a second aspect of the present invention, there is provided a process for producing a heat-shrinkable laminate film, comprising feeding a copolymer of vinylidene chloride as a gas-barrier layer, a polyolefin as outer layers, a polyamide or a thermoplastic polyester as at least one intermediate layer and an adhesive material as adhesive layers to an annular die provided with passages for the gas-barrier layer, the outer layers, the intermediate layer(s) and the adhesive layers and with adiabatic spaces disposed on the both sides of the passage(s) of the intermediate layer(s), in a melt state, each of the end portions of the passages of the gas-barrier layer, the outer layers, the intermediate layer(s) and the adhesive layers being assembled, laminating and extruding the copolymer of vinylidene chloride, the polyolefin, the polyamide or the thermoplastic polyester and the adhesive material, thereby forming laminate tubular film at the outlet of the annular die, cooling the resultant laminate tubular film by quenching, and after heating the laminate tubular film, biaxially stretching the resultant laminate tubular film, thereby forming a heat-shrinkable laminate tubular film.

BRIEF EXPLANATION OF DRAWING

Attached drawing.

DETAILED DESCRIPTION OF THE INVENTION

Figure 1:
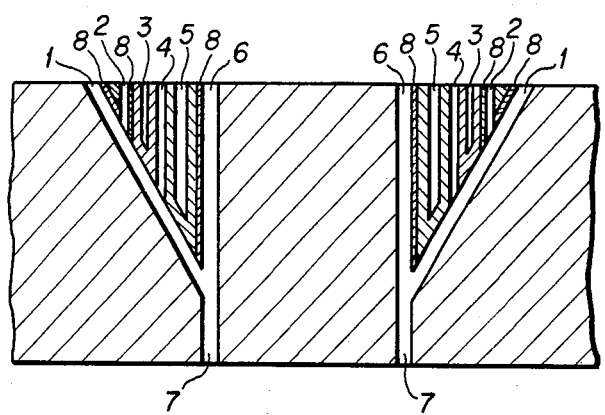
FIG. 1 is a vertical cross-sectional view of the annular die, particularly the junction part thereof where streams of all the layers of the film are assembled.

The heat-shrinkable laminate tubular film according to the present invention comprises a gas-barrier layer of VDC having a thickness of not less than 6 $\mu$m and not more than 30% of the total thickness of the laminate tubular film, outer layers of a polyolefin, at least one intermediate layer of a polyamide or a thermoplastic polyester having a thickness in a range of from 5 to 40% of the total thickness of the laminate tubular film and adhesive layers disposed respectively between any of the above layers, the crystal melting point of the polyamide or the thermoplastic polyester being not more than 240° C.

Since the gas-barrier layer of a VDC of the heat-shrinkable laminate tubular film according to the present invention is relatively thick, the retention time of the VDC in a passage of the die is relatively short and accordingly, there is a merit of scarcely causing the thermal decomposition of the VDC in the production of the laminate tubular film.

Further, since the heat-shrinkable laminate tubular film according to the present invention has at least one intermediate layer of the polyamide or the thermoplastic polyester having a specified thickness, the laminate tubular film according to the present invention shows an adequate rigidity thereby overcoming the difficulty due to elongation of the laminate tubular film caused by the weight of the article to be packaged in the packaging operation. In addition, the laminate tubular film according to the present invention exhibits more uniform stretchability than that of the laminate film disclosed in Japanese Patent Application Laying-Open No. 58-128821 (1983). The gas-barrier property of the laminate tubular film according to the present invention is of course excellent.

The VDC used as the gas-barrier layer of the heat-shrinkable laminate tubular film according to the present invention comprises a copolymer of from 65 to 95% by weight of vinylidene chloride and from 5 to 35% by weight of at least one comonomer copolymerizable with vinylidene chloride. As the comonomer copolymerizable with vinylidene chloride, for instance, vinyl chloride, acrylonitrile and, $C_1$ to $C_{18}$-alkyl acrylates may be mentioned. Of these comonomers, vinyl chloride is generally used. The VDC may contain a small amount of plasticizer(s) and/or stabilizer(s) according to necessity. These additives, i.e., the plasticizers and stabilizers, used in the present invention have been known by the persons skilled in the art and represented by, for example, dioctyl adipate and epoxidized soybean oil.

As has been stated, it is necessary that the thickness of the gas-barrier layer of the VDC is not less than 6 $\mu$m and is not more than 30%, preferably not more than 25% of the total thickness of the laminate tubular film according to the present invention. In the case of below 6 $\mu$m, the retention time thereof in the passage of the die becomes so large in extruding the VDC with the polyamide or the thermoplastic polyester in lamination that the VDC decomposes, thereby having difficulty in the co-extrusion. On the other hand, in the case of over 30% of the total thickness of the laminate tubular film, the impact strength of the laminate tubular film at low temperatures is reduced.

As the polyolefin of the outer layers, high density polyethylene, middle density polyethylene, low density polyethylene, ionomers, a copolymer of ethylene and vinyl acetate, a copolymer of ethylene and an ester of acrylic acid, a copolymer of ethylene and propylene, polypropylene, a copolymer of ethylene and $\alpha$-olefin (the so-called linear low density polyethylene, hereinafter referred to as LLDPE), a polybutene and mixture thereof may be mentioned.

The preferable embodiments of the outer layers from the viewpoint of stretchability of the layer(s) are as follows.

(i) At least one of outer layers is EVA of a crystal melting point of from 80° to 103° C.

(ii) One of the outer layers is EVA of a crystal melting point of 80° to 103° C., and the other of the outer layers is LLDPE of a crystal melting point of from 110° to 130° C.

(iii) One of the outer layers is EVA of a crystal melting point of 80 ° to 103° C., and the other of the outer layers is a mixture of not more than 40% by weight of the LLDPE of a crystal melting point of 110° to 130° C. and not less than 60% by weight of the EVA of a crystal melting point of 80° to 103° C.

(iv) Both the outer layers are the mixture of not more than 40% by weight of LLDPE of a crystal melting point of 110° to 130° C. and not less than 60% by weight of the EVA of a crystal melting point of 80° to 103° C.

Of the four embodiments, (i), (ii) and (iii) are preferable, particularly (i) is more preferable, from the viewpoint of transparency of the thus prepared layer(s).

In addition, the total thickness of the layer(s) of the polyolefin is preferably in a range of from 40 to 92% of the total thickness of the heat-shrinkable laminate tubular film according to the present invention.

The use of at least one polyamide or thermoplastic polyester layer as the intermediate layer(s) is the characteristic feature of the heat-shrinkable laminate film according to the present invention, and by disposing the layer(s) of polyamide or thermoplastic polyester of an adequate rigidity and a favorable stretchability as intermediate layer, the stretchability and the rigidity of the laminate film comprising a VDC layer and the polyolefin layer(s) have been improved.

The laminate film disposed with each of two polyamide or thermoplastic polyester layers as intermediate layer between each of two outer layers of polyolefin and a core layer of VDC through the adhesive layers is preferable.

As the polyamide, a polymer having a crystal melting point of not more than 240° C., preferably of 220° C. is used and for instance, Nylon 6-66 (copolymer consisting of Nylon 6 and Nylon 66), Nylon 610 (polyhexamethylene sebacamide), Nylon 612 (a condensate of hexamethylenediamine and 1,10-decanedicarboxylic acid), Nylon 11(a condensate of 11-aminoundecanoic acid), Nylon 12 (a ring-open polymerizate of laurolactam) and Nylon 6 (polycapramide) may be exemplified.

As the thermoplastic polyester, a polymer having a crystal melting point of not more than 240° C., preferably not more than 220° C. or showing no crystal melting point is used and the thermoplastic polyester comprises the acid moiety selected from an aromatic dibasic acid and an aliphatic dibasic acid and the glycol moiety selected from aliphatic glycol, cycloaliphatic glycol and aromatic glycol. As such an esters, for instance, Vylon (made by TOYOBO Co., Ltd.), Hytel (made by Goodyear Co., Ltd.) and PET-G (made by Eastman Kodak Co., Ltd.) may be exemplified.

For reference, the "crystal melting point" used in the present invention is the maximum temperature on a melting curve obtained by the determination on a specimen in an amount of 8 mg while using a differential scanning calorimeter (made by Perkin-Elmer Co., Model IB) at a rate of raising the temperature of 8° C./min.

In the case where the crystal melting point of the polyamide or the thermoplastic polyester is over 240° C., it is necessary to raise the extruding temperature, thereby the coextrusion of the polyamide or the thermoplastic polyester with VDC becomes difficult.

In the case where the heat-shrinkable laminate tubular film according to the present invention contains not less than two intermediate layers of the polyamide or the thermoplastic polyester, the two layers may be the same to each other or different from each other. It is necessary that the thickness of such layer is from 5 to 40%, more preferably from 5 to 20% of the total thickness of the laminate tubular film according to the present invention. In the case of the number of such layers of not less than 2, the total thickness of such layers is from 5 to 40% of the total thickness of the laminate tubular film according to the present invention. On the other hand, in the case where the thickness of such layer(s) is below 5% of the total thickness of the laminate tubular film according to the present invention, such layer(s) cannot contribute to the rigidity of the laminate tubular film, and in the case of over 40%, the coextrusion with the VDC is difficult. From the viewpoint of co-extrudability with the VDC, the thickness of such layer(s) is more preferably not more than 20% of the total thickness of the laminate tubular film according to the present invention.

As the adhesive material forming the adhesive layer, EVA containing from 13 to 28% by weight of vinyl acetate units, a copolymer of ethylene and an ester of acrylic acid containing from 13 to 28% by weight of the ester of acrylic acid, a modified copolymer of ethylene and an ester of acrylic acid with an unsaturated carboxylic acid and a material obtained by further modifying the thus modified copolymer with a metal may be exemplified. Of the above adhesive, the modified copolymer of ethylene and an ester of acrylic acid with the unsaturated carboxylic acid, and the material obtained by further modifying the thus modified copolymer of ethylene and an acrylic ester, with a metal are more preferable.

Any one of the above-mentioned adhesive layer is disposed between the polyolefin layer and the VDC layer, between the VDC layer and the polyamide or the thermoplastic polyester layer, and between the polyolefin and the polyamide or thermoplastic polyester layer.

The thickness of an adhesive layer is preferably from 0.5 to 3 μm, and the total thickness of the heat-shrinkable laminate film is preferably from 20 to 120 82 m.

In the preparation of the heat-shrinkable laminate tubular film, a plurality of resins each of which constructs each of layers of the object laminate tubular film are respectively co-extruded from a common annular die connected to a plurality of extruders corresponding to a plurality of resins, thereby being extruded from the die as a laminate tubular film.

An assembling part of an example of such an annular die is schematically shown in FIG. 1 in which 7 is a passage of the assembled flow of the molten resins and the respective passages of the molten polyolefin, the molten VDC, the molten polyamide or the molten thermoplastic polyester, the molten polyolefin and the molten adhesive agent are shown by 1, 2, 4, 6 and 8. As shown in FIG. 1, it is preferable to provide the respective adiabatic spaces 3 and 5 on the both sides of the passage of the molten polyamide or the molten thermoplastic polyester. By the thus provided adiabatic spaces, even in the case where the thermoplastic polyester is extruded at a high temperature, since the direct heat transfer to the VDC layer therefrom can be prevented, the VDC which is relatively apt to be decomposed can be coextruded with the thermoplastic polyester or the polyamide. In the case of preparing a laminate flat film by using a T-die, the both end parts of the layer of the VDC coextruded with the polyamide layer or the thermoplastic polyester layer are apt to be decomposed and accordingly, such an operation is not favorable.

Although the order of lamination of the layers is optional as far as both of the outer layers are a polyolefin, the arrangement of the layers in the laminate tubular film is preferably in the following order from the outer layer to the inner layer:

polyolefin layer/adhesive agent layer/VDC layer/adhesive resin layer/polyamide layer or the thermoplastic resin layer/adhesive resin layer/polyolefin layer.

The thus extruded laminate tubular film is stretched biaxially following the conventional biaxial inflation method to form the heat-shrinkable laminate tubular film according to the present invention.

Since the thus prepared, heat-shrinkable laminate tubular film of the present invention shows gas-barrier property and an adequate rigidity, it is suitably used in packaging particularly foodstuffs.

The present invention will be explained more in detail while referring to the following non-limitative examples.

EXAMPLES 1 TO 5 AND COMPARATIVE EXAMPLES 1 TO 3

The VDC, the adhesive agent, the polyamide, the thermoplastic polyester and the polyolefin respectively shown in Table 1 were extruded from a plurality of extruders, respectively, and the thus extruded, molten resins were supplied, particularly in Examples 1 to 5, to the annular co-extruding die provided with the adiabatic spaces (3 and 5) shown in FIG. 1, thereby extruding the thus supplied molten resins as a laminate tubular film. The thus prepared laminate tubular film was cooled in a quenching bath at 15° to 25° C. to form a laminate tubular film of 120 mm in folded width and 540 μm in thickness. A small amount of soy-bean oil had been introduced into the inside space of the tubular film for the prevention of self-adherence of the inner layer when folded.

Then, the laminate tubular film was transferred through a hot water bath at a temperature shown in Table 3 at a transferring speed of 20 m/min and heated for about 12 sec while being pinched by the first pair of nip-rolls rotating at a speed of 20 m/min. Thereafter, the thus heated tubular film was taken out from the hot water bath and was stretched between the first pair of nip-folls rotating at a speed of 20 m/min and the second pair of nip-rolls rotating at a speed of 60 m/min, into the longitudinal direction at a stretched ratio of 3 (i.e. 60/20=3) while simultaneously being stretched to the diametrical direction 3 times by air supplied into the inside space of the tubular film. The thus obtained, biaxially stretched laminate film was 350 mm in folded width and about 60 micrometer in thickness.

The same procedures were carried out in Comparative Examples 1 to 3 except for using a conventional circular co-extruding die not provided with the adiabatic space as shown in FIG. 1 instead of the die shown in FIG. 1.

The physical properties of the resins used in Examples 1 to 5 and Comparative Examples 1 to 3 are shown in Table 1; the methods for determination of the physical properties of the films produced thereby are shown in Table 2 and the layer construction and the test data of the thus produced films are shown in Table 3.

TABLE 1

| | Properties of Resins used | | | |
|---|---|---|---|---|
| Resin | Density | Melt index (g/10 min) | Crystal melting point (°C.) | Remarks |
| VDC[1] | — | — | — | |
| Polyamide | 1.14 | — | 215 | Nylon 6–66 made by TORAY Co., Ltd. |
| Thermoplastic polyester | 1.267 | — | not shown | PET-G, made by Eastman Kodak Co., Ltd. |
| LLDPE | 0.922 | 2.5 | 122 | Made by MITSUITOATSU Co., Ltd. |
| EVA-1 | 0.933 | 1.1 | 96 | Content of vinyl acetate units of 5.5% by weight |
| EVA-2 | 0.93 | 1.5 | 91 | Content of vinyl acetate units of 10% by weight |
| EVA-3 | 0.94 | 0.6 | 82 | Content of vinyl acetate units of 15% by weight |

TABLE 1-continued

| | Properties of Resins used | | | |
|---|---|---|---|---|
| Resin | Density | Melt index (g/10 min) | Crystal melting point (°C.) | Remarks |
| N—polymer (as adhesive)[2] | 0.95 | 6 | — | |

Notes
[1]A resinuous mixture of 100 parts by weight of a copolymer of vinylidene chloride (70% by weight) and vinyl chloride (30% by weight) and 1 part by weight of an epoxidized soy-bean oil.
[2]A modified copolymer of ethylene and an ester of acrylic acid, obtained by modifying the copolymer of ethylene and an ester of acrylic acid with an unsaturated carboxylic acid, made by Nippon Petrochemical Co., Ltd.

TABLE 2

| Item | Method |
|---|---|
| Shrinkage in hot water | After immersing a specimen (10 cm square) of each of the laminate films at a relaxed state thereof in hot water at 90° C. for one min, the percentage of the length to the original length and the percentage of the width to the original width are shown, respectively as the averaged values of the test data on 20 specimens. |
| Gas-barrier property | The volume of gaseous oxygen (ml/m$^2$ of the film · 24 hours · atm) permeated through a specimen of each of the laminate films at 30° C. and relative humidity of 100%, respectively as the averaged values of the test data on 3 specimen. |

TABLE 3

Layer Construction of Tubular Film and Temperature of Hot Water Bath

| Examples and Comparative Example | 1st layer (μm) | 2nd layer (μm) | 3rd layer (μm) | 4th layer (μm) | 5th layer (μm) | 6th layer (μm) | 7th layer (μm) | Temperature of Hot Water Bath (°C.) |
|---|---|---|---|---|---|---|---|---|
| Ex. 1 | EVA-3 (12) | N—polymer (1) | VDC (8) | N—polymer (1) | Polyamide (6) | N—polymer (1) | EVA-3 (31) | 85 |
| Ex. 2 | EVA-3 (12) | N—polymer (1) | VDC (8) | N—polymer (1) | PET-G (6) | N—polymer (1) | EVA-3 (31) | 87 |
| Ex. 3 | LLDPE/EVA-1*[1] (12) | N—polymer (1) | VDC (10) | N—polymer (1) | Polyamide (6) | N—polymer (1) | LLDPE/ (29) | 94 |
| Ex. 4 | LLDPE (9) | N—polymer (1) | VDC (8) | N—polymer (1) | PET-G (6) | N—polymer (1) | EVA-2 (34) | 95 |
| Ex. 5 | LLDPE/EVA-1*[1] (12) | N—polymer (1) | VDC (10) | N—polymer (1) | Polyamide (4) | N—polymer (1) | EVA-1 (31) | 93 |
| Comparat. Ex. 1 | EVA-3 (15) | N—polymer (1) | VDC (8) | N—polymer (1) | EVA-3 (6) | N—polymer (1) | EVA-3 (28) | 89 |
| Comparat. Ex. 2 | EVA-3 (12) | N—polymer (1) | VDC (4) | N—polymer (1) | Polyamide (15) | N—polymer (1) | EVA-3 (26) | — |
| Comparat. Ex. 3 | LLDPE/EVA-1*[1] (7) | N—polymer (1) | VDC (8) | N—polymer (1) | PET-G (27) | N—polymer (1) | LLDPE/ (15) | 98 |

Notes:
*[1]A mixture of 30 parts by weight of LLDPE and 70 parts by weight of EVA-1
*[2]A mixture of 30 parts by weight of LLDPE and 70 parts by weight EVA-2

TABLE 3-2

Physical Properties of Tubular Film

| Example or Comparative Example | Stretchability | Rigidity | Rate of heat-shrinkage (longitudinal/transversal) | Gas-barrier property | Coextrudability of tubular film |
|---|---|---|---|---|---|
| Example | | | | | |
| 1 | A | A | 51/53 | 58 | A |
| 2 | A | A | 55/56 | 59 | A |
| 3 | A | A | 43/45 | 50 | A |
| 4 | A | A | 44/46 | 59 | A |
| 5 | A | A | 45/47 | 50 | A |
| Comparative Example | | | | | |
| 1 | B | C | 50/53 | 60 | A |
| 2 | — | — | — | — | C |

TABLE 3-2-continued

| | Physical Properties of Tubular Film | | | | |
|---|---|---|---|---|---|
| Example or Comparative Example | Stretchability | Rigidity | Rate of heat-shrinkage (longitudinal/transversal) | Gas-barrier property | Coextrudability of tubular film |
| 3 | C | — | — | — | B |

(Notes)
(1) Stretchability:
A: Excellent, particularly excellently stretchable with unevenness of the thickness of the film of below 30%,
B: Inferior, although stretchable, with unevenness of the thickness of the fim of from 30 to 50%,
C: Poor, although stretchable, without steadiness and with unevenness of the thickness of the film over 50%.
(2) Rigidity:
A: Excellent, defects in the packaging operation such as the elongation of the film due to the content scarcely occur,
B: Inferior, defects in the packaging operation occur some times,
C: Poor, defects in the packaging operation are apt to occur.
(3) Coextrudability of the layers into a composite laminate tube:
A: Coextrusion was possible continuously for more than 10 hours,
B: The time of sufficient, continuous extrusion was below 10 hours,
C: Coextrusion could be continued only less than one hour.

As are clearly seen in the results of Examples 1 to 5 shown in Table 3, the heat-shrinkable laminate tubular film according to the present invention is excellent in stretchablity and adequate rigidity, thereby excellent in processability in the packaging operation. In addition, the combination of the resins for producing the film was excellent in coextrudability.

On the other hand, although the resin combination of Comparative Example 1 was excellent for coextruding, the rigidity of the film was poor resulting in the poor processability in the packaging operation due to the absence of the layer of the polyamide or the thermoplastic polyester.

Although the resin combination of Comparative Example 2 includes the polyamide for the inner layer, because of the too thin layer of the VDC, decomposition of the VDC occurred to inhibit the continuous operation of coextrusion. In Comparative Example 3, because of the too large thickness of the layer of the thermoplastic polyester, the coextrudability was poor to cause the decomposition of the VDC. In addition, the co-extruded film was poor in stretchability. By the above-mentioned demerits, any favorable laminate film could not be obtained.

What is claimed is:

1. A coextruded, biaxially stretched and laminated heat-shrinkable tubular film, comprising:
   a gas-barrier layer of a copolymer of vinylidene chloride having a thickness, which is not more than 30% of the total thickness of the coextruded, biaxially stretched and laminated heat-shrinkable tubular film, of not less than 6 μm, outer layers of a polyolefin, at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film, and adhesive layers disposed between all or certain polymer layers, and
   the total thickness of the coextruded, biaxially stretched and laminated heat-shrinkable tubular film being in the range of 20 to 120 micrometers,
   the coextruded, biaxially stretched and laminated heat-shrinkable tubular film being produced by laminating and co-extruding the copolymer of vinylidene chloride, the polyolefin, polyamide or the thermoplastic polyester and the adhesive material, cooling, heating and stretching the resultant laminated tubular film.

2. A coextruded, biaxially stretched and laminated heat-shrinkable tubular film, comprising:
   (A) a gas-barrier layer of a copolymer of vinylidene chloride having a thickness which is not more than 30% of the total thickness of the coextruded, biaxially stretched and laminated heat-shrinkable tubular film, of not less than 6 μm;
   (B) outer layers which are of one of the following two combinations:
      (1) one outer layer consisting essentially of a copolymer of ethylene and vinyl acetate of a crystal melting point ranging from 80° to 103° C. and the other outer layer consisting essentially of a linear low-density polyethylene of a crystal melting point ranging from 110° to 130° C.,
      (2) both outer layers consisting essentially of a mixture of not more than 40% by weight of a linear low-density polyethylene of a crystal melting point ranging from 110° to 130° C. and not less than 60% by weight of a copolymer of ethylene and vinyl acetate of a crystal melting point ranging from 80° to 103° C., and
   (C) at least one intermediate layer of a polyamide or a thermoplastic polyester, both of which show a crystal melting point of not more than 240° C., said intermediate layer having a thickness of 5 to 40% of the total thickness of the coextruded, biaxially stretched and laminated heat-shrinkable tubular film; and
   (D) adhesive layers which are disposed between all or certain polymer layers.
   the total thickness of the coextruded, biaxially stretched and laminated heat-shrinkable tubular film being in the range of 20 to 120 micrometers.

3. The coextruded, biaxially stretched and laminated heat-shrinkable tubular film according to claim 2, wherein both outer layers consist essentially of a copolymer of ethylene and vinyl acetate of a crystal melting point ranging from 80°0 to 103° C.

4. The coextruded, biaxially stretched and laminated heat-shrinkable tubular film according to claim 2, wherein both outer layers consist essentially of a mixture of more than 0% by weight and not more than 40% by weight of a linear low-density polyethylene of a crystal melting point ranging from 110° to 130° C., and not less than 60% by weight and less than 100% by weight of a copolymer of ethylene and vinyl acetate of a crystal melting point ranging from 80° to 103° C.

5. The coextruded, biaxially stretched and laminated heat-shrinkable tubular film according to claim 2, wherein one outer layer consists essentially of a mixture of more than 0% by weight and not more than 40% by weight of a linear low-density polyethylene of a crystal melting point ranging from 110° to 130° C., and not less than 60% by weight and less than 100% by weight of a copolymer of ethylene and vinyl acetate of a crystal melting point ranging from 80° to 103° C. and the other outer layer consists essentially of a copolymer of ethylene and vinyl acetate of a crystal melting point ranging from 80° to 103° C.

6. The coextruded, biaxially stretched and laminated heat-shrinkable tubular film according to claim 2, wherein the thickness of the gas-barrier layer is more than 6 μm and not more than 25% of the total thickness of the coextruded, biaxially stretched and laminated heat-shrinkable tubular film, the thickness of the outer layer is in the range of 40 to 92% of the total thickness of the coextruded, biaxially stretched and laminated heat-shrinkable tubular film, the thickness of the intermediate layer(s) of a polyamide or a thermoplastic polyester is in the range of 5 to 20% of the total thickness of the coextruded, biaxially stretched and laminated heat-shrinkable tubular film, and the thickness of each adhesive layer is 0.5 to 3.0 μm.

7. The coextruded, biaxially stretched and laminated heat-shrinkable tubular film according to claim 2, wherein the comonomer copolymerizable with vinylidene chloride is vinyl chloride, acrylonitrile, or $C_1$-$C_{18}$-alkyl acrylate.

8. The coextruded, biaxially stretched and laminated heat-shrinkable tubular film according to claim 2, wherein said polyamide is Nylon 6-66 (a copolymer of ε-caprolactam and hexamethyleneadipamide), Nylon 6-10 (polyhexamethylene sebacamide), Nylon 6-12 (a condensate of hexamethylenediamine and 1,10-decanedicarboxylic acid), Nylon 11 (polyundeceaneamide), Nylon 12 (a polymer of ring opened laurolactam), or Nylon 6 (polycapramide).

9. The coextruded, biaxially stretched and laminated heat-shrinkable tubular film according to claim 2, wherein said polyester is a polymer prepared by condensing an aliphatic dibasic acid or an aromatic dibasic acid with an aliphatic glycol, a cycloaliphatic glycol or an aromatic glycol.

10. The coextruded, biaxially stretched and laminated heat-shrinkable tubular film according to claim 1, wherein said outer polyolefin layers are prepared from at least one polymer selected from the group consisting of:

(1) a copolymer of ethylene and vinyl acetate having a crystal melting point ranging from 80° to 103° C., (2) a linear low-density polyethylene having a crystal melting point ranging from 110° to 130° C., and (3) a mixture of more than 0% and not more than 40% by weight of a linear low-density polyethylene having a crystal melting point ranging from 110° to 130° C., and not less than 60% and less than 100% by weight of a copolymer of ethylene and vinyl acetate having a crystal melting point ranging from 80° to 103° C.

* * * * *